US010963960B1

(12) United States Patent
Kushner et al.

(10) Patent No.: US 10,963,960 B1
(45) Date of Patent: Mar. 30, 2021

(54) COMPUTER SYSTEM FOR AUTOMATIC CREDIT ALLOCATION OF A SHARED LINE OF CREDIT

(71) Applicant: Wells Fargo Bank, N.A., San Francisco, CA (US)

(72) Inventors: Kristine Ing Kushner, Orinda, CA (US); John T. Wright, Benicia, CA (US); Paul Vittimberga, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 113 days.

(21) Appl. No.: 16/117,927

(22) Filed: Aug. 30, 2018

(51) Int. Cl.
*G06Q 40/00* (2012.01)
*G06Q 40/02* (2012.01)
*H04L 29/08* (2006.01)
*G06N 20/00* (2019.01)

(52) U.S. Cl.
CPC ........... *G06Q 40/025* (2013.01); *G06N 20/00* (2019.01); *H04L 67/22* (2013.01)

(58) Field of Classification Search
CPC ...... G06Q 40/025; G06N 20/00; H04L 67/22; H04W 72/042
USPC ..................................... 705/35, 38
See application file for complete search history.

(56) References Cited

U.S. PATENT DOCUMENTS

| | | | |
|---|---|---|---|
| 6,105,009 A * | 8/2000 | Cuervo | G06Q 20/00 235/375 |
| 6,343,279 B1 | 1/2002 | Bissonette et al. | |
| 6,405,182 B1 * | 6/2002 | Cuervo | G06Q 20/00 235/375 |
| 7,685,064 B1 * | 3/2010 | Cox | G06Q 20/102 705/38 |
| 8,065,230 B1 * | 11/2011 | Little | G06Q 20/102 705/40 |
| 8,301,554 B2 | 10/2012 | Simpson et al. | |
| 9,135,614 B2 | 9/2015 | Goodson et al. | |
| 9,515,937 B2 * | 12/2016 | Bostick | H04L 47/125 |
| 9,870,589 B1 * | 1/2018 | Arnold | G06Q 40/025 |

(Continued)

FOREIGN PATENT DOCUMENTS

| | | | | |
|---|---|---|---|---|
| CN | 111626730 A | * | 6/2020 | ............ G06Q 20/34 |
| KR | 20100009238 U | | 9/2010 | |

OTHER PUBLICATIONS

Norden et al., "Credit Line Usage, Checking Account Activity, and Default Risk of Bank Borrowers," The Review of Financial Studies, vol. 23, No. 10, Oct. 2010, 36 pp.

*Primary Examiner* — William E Rankins
(74) *Attorney, Agent, or Firm* — Shumaker & Sieffert, P.A.

(57) ABSTRACT

A computer system is described that automatically allocates credit between two or more users of a shared line of credit. For example, a computer system is configured to monitor information relating to a plurality of credit needs of a plurality of users of a shared line of credit and feed the information into a trained machine learning model to automatically determine whether an amount of credit allocated to each user of the plurality of users is sufficient for the respective user's credit need. Based on output from the model, the computer system may automatically reallocate credit to at least a first one of the users identified as needing additional credit from at least a second one of the users identified as having unused or unneeded credit.

19 Claims, 3 Drawing Sheets

(56) References Cited

U.S. PATENT DOCUMENTS

| | | | |
|---|---|---|---|
| 2003/0120571 A1* | 6/2003 | Blagg | G06Q 20/04 |
| | | | 705/35 |
| 2004/0083184 A1* | 4/2004 | Tsuei | G06Q 10/08 |
| | | | 705/74 |
| 2009/0007125 A1* | 1/2009 | Barsness | G06F 9/5077 |
| | | | 718/104 |
| 2009/0119202 A1* | 5/2009 | Dumas-Brown | G06Q 20/10 |
| | | | 705/38 |
| 2012/0265681 A1* | 10/2012 | Ross | G06Q 40/02 |
| | | | 705/44 |
| 2015/0095230 A1 | 4/2015 | Harold et al. | |
| 2016/0225073 A1* | 8/2016 | Xiao | G06Q 40/025 |
| 2016/0267584 A1* | 9/2016 | Nair | G06Q 40/025 |
| 2017/0169507 A1* | 6/2017 | Skaarup | G06Q 40/02 |
| 2018/0075391 A1 | 3/2018 | Chung et al. | |
| 2019/0258818 A1* | 8/2019 | Yu | G06F 21/6245 |

\* cited by examiner

COMPUTER SYSTEM FOR AUTOMATIC CREDIT ALLOCATION OF A SHARED LINE OF CREDIT

TECHNICAL FIELD

The present disclosure relates to computer systems, and in particular, using machine learning techniques to predict credit usage.

BACKGROUND

In some examples, a line of credit may be shared between two or more users. In some such examples, each user may have a credit card with access to a specific portion of the shared line of credit. As one example, a corporation may provide corporate credit cards to two or more employees, and the two or more employees may each have access to a portion of the corporation's shared line of credit. In some such examples, the employees with access to the shared line of credit or an administrator may manage usage of the shared line of credit and/or transfers of balances to and from other lines of credit or deposit accounts. As another example, a family or another group may have multiple people linked to one line of credit, and each person may be able to use a certain amount of credit available from the shared line of credit. In some examples, the shared line of credit may be split evenly between the two or more users (e.g., each user has access to the same portion of the shared line or credit). In other examples, one of the users of the shared line of credit may have access to a different portion of the shared line of credit than another of the users of the shared line of credit

SUMMARY

The disclosure describes computer systems to automatically allocate credit between two or more users of a shared line of credit. For example, a computer system is configured to monitor information relating to a plurality of credit needs of a plurality of users of a shared line of credit and feed the information into a trained machine learning model to automatically determine whether an amount of credit allocated to each user of the plurality of users is sufficient for the respective user's credit need. Based on output from the model, the computer system may automatically reallocate credit to at least a first one of the users identified as needing additional credit from at least a second one of the users identified as having unused or unneeded credit. In the case where none of the users has unused or unneeded credit, the computer system may automatically reallocate credit to the first one of the users from an unused account (e.g., a "ghost" account). Additionally, or alternatively, the computer system may be able to increase the amount of credit available for reallocation by automatically paying down at least a portion of the used credit of the shared line of credit.

In this way, the computer system may be able to anticipate credit needs of the plurality of users of a shared line of credit and automatically reallocate credit to users when appropriate. The trained machine learning model of the computer system may enable the credit reallocation to be faster and/or more accurate that other computer systems or credit allocation by human users. For example, a user of the shared line of credit may not have to track their own credit needs and preemptively request a credit increase for an upcoming purchase or busy work period. In addition, an administrator, e.g., a manager of a business unit that includes the plurality of users of the shared line of credit, may not have to approve credit reallocation or readjustment requests, or otherwise directly manage the shared line of credit. In this manner, the computer system described herein may reduce or eliminate human error resulting in more accurate or appropriate credit allocation for the plurality of users, as the machine learning model is configured to determine the credit needs of the plurality of users rather than the users themselves anticipating their credit needs to preemptively request credit increases and the administrator making the credit reallocation decisions in response to the users' requests.

In some examples, the credit reallocation by the computer system may also be faster due to the speed of the credit need prediction of the plurality of users by the machine learning model. The computation speed of the machine learning model may enable the computer system to have an overall view of the credit allocation of the shared line of credit, which may enable more accurate credit allocation across the plurality of users, rather than other computer systems or an administrator determining the credit allocation in a relatively ad hoc manner and/or on a user-by-user basis. For example, in some other systems, credit reallocation may only be performed to respond to a credit increase request by a user and without taking a holistic view of the distribution of the shared line of credit across all of the users. Thus, such systems may be subject to a less efficient use of the shared line of credit, as some users may have a relatively large amount of unused credit but are not likely to request a credit decrease. In turn, the machine learning model of the computer system described herein may provide the users of the shared line of credit with a suitable amount of credit, which may help prevent users from exceeding their credit limit or having a relatively large amount of unused credit.

As one example, a method includes monitoring, by a computer system, information related to a plurality of credit needs of a plurality of users of a shared line of credit; determining, by the computer system and based on the monitored information, the plurality of credit needs of the plurality of users of the shared line of credit; and determining, by the computer system, that a first credit need of a first user of the plurality of users is greater than a first current credit amount of the first user. The method further includes analyzing, by the computer system, one or more of the plurality of credit needs of the other users of the plurality of users of the shared line of credit and reallocating, by the computer system, credit from the shared line of credit to the first user based on the analysis to provide a first updated credit amount for the first user, where the first updated credit amount is greater than or equal to the first determined credit need of the first user.

As another example, a credit allocation system includes a memory and one or more processors in communication with the memory. The one or more processors are configured to monitor information related to a plurality of credit needs of a plurality of users of a shared line of credit; determine, based on the monitored information, the plurality of credit needs of the plurality of users of the shared line of credit; determine that a first credit need of a first user of the plurality of users is greater than a first current credit amount of the first user; analyze one or more of the plurality of credit needs of the other users of the plurality of users of the shared line of credit; and reallocate credit from the shared line of credit to the first user based on the analysis to provide a first updated credit amount for the first user, where the first updated credit amount is greater than or equal to the first determined credit need of the first user.

As yet another example, a computer readable medium includes instructions that when executed cause one or more processors to monitor information related to a plurality of credit needs of a plurality of users of a shared line of credit; determine, based on the monitored information, the plurality of credit needs of the plurality of users of the shared line of credit; determine that a first credit need of a first user of the plurality of users is greater than a first current credit amount of the first user; analyze one of more of the plurality of credit needs of the other users of the plurality of users of the shared line of credit; and reallocate credit from the shared line of credit to the first user based on the analysis to provide a first updated credit amount for the first user, where the first updated credit amount is greater than or equal to the first determined credit need of the first user.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes computer systems to automatically allocate credit between two or more users of a shared line of credit. For example, a computer system is configured to monitor information relating to a plurality of credit needs of a plurality of users of a shared line of credit and feed the information into a trained machine learning model to automatically determine a plurality of credit needs of the users of the shared line of credit. Based on output from the model, the computer system may automatically reallocate credit to at least a first one of the users identified as needing additional credit from at least a second one of the users identified as having unused or unneeded credit, from an unused account (e.g., a "ghost" account), or by automatically paying down at least a portion of the used credit of the shared line of credit.

The machine learning model may be able to determine the credit needs of the plurality of users of the shared line of credit both relatively quickly and accurately. Based on the determined credit needs of the plurality of users, the computer system may reallocate credit of the shared line of credit. Such credit reallocation may also be relatively quick and accurate in comparison to some other computer systems or credit reallocation by an administrator or another user. For example, an employee may not have to specifically request a credit increase, and an administrator may not have to approve credit adjustment requests, allocate the credit, or otherwise directly manage the shared line of credit, which could be time consuming, inaccurate, or result in a relatively inefficient use of the shared line of credit. As one example, other systems and/or credit allocation by an administrator may rely on users submitting credit adjustment requests to prompt credit reallocation. In some cases, the user may not accurately determine a credit need, may not request a credit decrease request, or the like. In comparison, the computer system described herein may automatically manage the shared line of credit such that users of the shared line of credit have access to an appropriate amount of credit relative to the respective user's anticipated credit need determined by the trained machine learning model, which may help prevent users from exceeding their credit limit or having a relatively large amount of unused credit.

In some examples, a business may have access to one or more shared lines of credit from a credit issuer. For example, a business may provide two or more employees access to the shared line of credit, such that each employee has access to a portion of the amount of the shared line of credit. Additionally, or alternatively, one or more business units within a business may have access to its own shared line of credit. For instance, a sales business unit may have access to a first shared line of credit and an engineering business unit may have access to a second shared line of credit. In turn, employees of the sales business unit and the engineering business unit may have access to a portion of the respective shared line of credit of the business unit. In other examples, businesses may have one or more shared lines of credit configured in a different manner (e.g., other than based on business units).

Some shared lines of credit are managed by one or more individuals. For example, an administrator, a manager, a business owner, a chief financial officer, or another person may directly manage a shared line of credit by reallocating credit to users of the shared line of credit, approving or denying credit adjustment requests, determining which users to give credit to or take credit from, paying off the credit line, or the like. In such systems, the administrator of the shared line of credit may have to manually allocate funds, determine if an allocation of funds is appropriate, or the like, which may be time consuming, difficult, or inaccurate. For example, it may be difficult for the administrator to see an accurate high-level picture of the credit needs of all of the users of the shared line of credit in order to reallocate funds between users in a relatively non-disruptive and long-term manner. In turn, the managing individual may have to reallocate credit more often, may not choose an appropriate user to reallocate credit from, may not notice patterns related to the use of the shared line of credit, may not anticipate credit needs without receiving an explicit credit adjustment request, or the like.

Additionally, or alternatively, some credit allocation systems may be computer-based. However, such computer-based credit allocation systems may only reallocate credit of a shared line of credit in response to a credit adjustment request, a reallocation decision from an administrator, or the like. In this way, such computer-based systems may determine to reallocate credit in a relatively ad hoc manner. For example, the computer-based systems may not have access to the credit needs of the plurality of users of the shared line of credit (e.g., may only have access to some of the credit needs of some of the plurality of users) or may not be able to even determine such credit needs of the plurality of users (e.g., may only know to adjust credit based on user input). In turn, the computer-based systems may be relatively inefficient and inaccurate.

As described in more detail below, the computer system described herein is configured to use machine learning techniques to automatically reallocate credit of a shared line of credit. The system described herein may be more accurate, more efficient, provide relatively stable credit reallocations, or the like in comparison to some other credit allocation systems. For example, the trained machine learning model may be able to quickly and accurately determine credit needs of a plurality of users of a shared line of credit.

Figure 1:
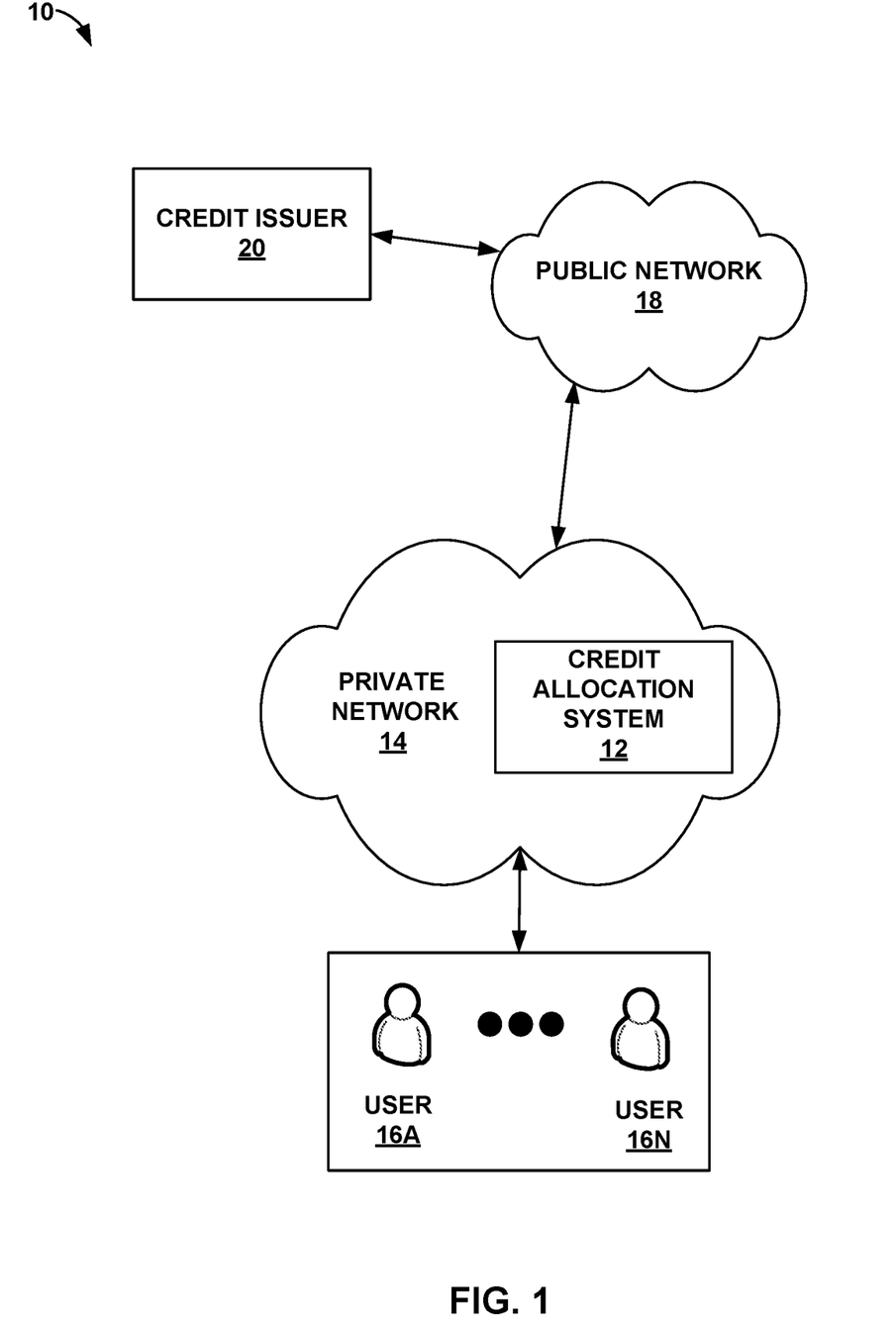
FIG. 1 is a conceptual diagram illustrating an example system including a credit allocation system for managing and allocating credit of a shared line of credit, in accordance with the disclosure.

FIG. 1 is a conceptual diagram illustrating an example system 10 including a credit allocation system 12 for managing and allocating credit of a shared line of credit, in accordance with the disclosure. As shown in the example of FIG. 1, credit allocation system 12 is associated with a business or company having a private network 14. In some examples, private network 14 may include one or more of a wide area network (WAN), a local area network (LAN), a virtual private network (VPN), an enterprise network, or another wired or wireless communication network. Although illustrated as a single entity, private network 14 may include a combination of two or more private networks.

Private network 14 may be a network owned and/or operated by a business or company that has access to one or more lines of credit, which may be divided between different business units or groups within the business. For example, private network 14 may owned and/or operated by a corporation, an organization, or another entity. In other examples, a family unit, an educational institution, or another group may use credit allocation system 12 as described herein. Although the following description will primarily refer to a corporation using credit allocation system 12, it should be understood that in other examples, a different entity may use, own, and/or operate credit allocation system 12.

In some examples, a corporation may have access to one or more lines of credit through a credit issuer 20. Credit issuer 20 may be a traditional bank or credit union with the capability to issue a line of credit to a user or a corporation. For example, credit issuer 20 may make credit available to a corporation and may pay merchants upon use of such credit by the corporation. The corporation may then pay off the amount of used credit to credit issuer 20 at a later date. Additionally, or alternatively, card issuer 20 may include a payment processing network, such as, for example, MasterCard, Visa, American Express, or Discover. In some examples, credit issuer 20 may distribute one or more credit cards to the corporation for access to the issued line of credit. In some cases, the corporation may distribute portions of the line of credit to a plurality of users 16A-16N (collectively, "plurality of users 16"). For example, each user may be given a credit card with access to a portion of the line of credit. In other words, each credit card associated with a respective user of the plurality of users of the line of credit may be a sub-account linked to a main account associated with the corporation that has been issued the line of credit by credit issuer 20. Thus, the line of credit may be a shared line of credit.

In some examples, a shared line of credit may be distributed across the entire business (e.g., throughout more than one business unit, type of employee, or the like). In other examples, one or more business units within a corporation may each have access to a respective shared line of credit allocated for the specific business unit. For example, a first business unit within a corporation may have access to a first line of credit and a second business unit within the same corporation may have access to a second line of credit. The different lines of credit for the different unit may have access to the same or different amounts of credit. In some examples, one or more shared lines of credit may be distributed within a corporation in an additional or alternative way. As one example, different geographical locations or sites of a corporation may each have access to a respective shared line of credit.

Regardless of whether a shared line of credit is distributed across a corporation, for a specific business unit, or based on another configuration, in some examples, the shared line of credit may be evenly distributed across the plurality of users 16. For instance, each user may have access to the same amount of credit of the shared line of credit. In other examples, one or more users of the shared line of credit may have access to a different amount of credit than one or more other users of the shared line of credit. In some examples, a credit need of a user may depend on various factors. For example, a credit need of a user of the plurality of users 16 may depend on a job function of the user, spending habits of the user, a business unit that the user is associated with, a purchase cycle of the corporation, privacy rules of the corporation, preferences of the user, a period of time (e.g., a time of year), a geolocation of the user, or the like. In addition, in some examples, the credit need of one or more users of the plurality of users 16 may change over time. For example, the credit need of a user may change based on parameters such as travel, memberships (e.g., professional association memberships), conference or event attendance, spending habits, or the like.

Credit allocation system 12 is configured to monitor information relating to the credit needs of the plurality of users 16 of the shared line of credit, determine credit needs of the plurality of users 16, and automatically reallocate credit to and/or from users of the plurality of users 16 based on the determined credit needs of the plurality of users 16. The functionality of credit allocation system 12 may be implemented in hardware or in a combination of software and hardware, where requisite hardware may be provided to store and execute software instructions. While shown as a single computing device in the example of FIG. 1 for purposes of illustration, in some examples, credit allocation system 12 may executed on a distributed network of computing devices including one or more workstations, servers, and/or other computing devices within private network 14 or another private network. In some examples, credit allocation system 12 may comprise an application, program, or other software provided by card issuer 20 for use by the corporation of private network 14 to manage one or more shared lines of credit.

In some examples, credit allocation system 12 monitors information related to credit issuer 20 and/or users 16. In some cases, credit allocation system 12 may access information related to credit issuer 20 via a public network 18, such as the Internet, and may access information related to users 16 via private network 14. In other examples, credit allocation system 12 may access information related to credit issuer 20 and/or users 16 via a different wired or wireless communication network other than the public network 18 or private network 14, respectively.

For example, credit allocation system 12 may monitor information related to credit issuer 20 and/or the plurality of users 16 to determine the credit needs of the plurality of users, how to allocate credit between the plurality of users 16, or the like. In some such examples, credit allocation system 12 may access information related to credit issuer 12 to determine a credit usage history (e.g., related to the shared line of credit) of one or more users of the plurality of users 16, which may indicate a credit need of the one or more users. For instance, a credit usage history including purchases that may be related to travel, such as purchases to book a flight, hotel, rental vehicle, or the like, may indicate that a user is expecting to travel and may have a higher credit need due to travelling. In some examples, credit allocation system 12 may monitor credit usage history based at least in part on stored receipt information from transactions related to the shared line of credit. Additional or alternative information related to the shared line of credit may also indicate a credit need of a user of the plurality of users 16. For example, invoice or billing information relating to the shared line of credit or another account may also be monitored in some cases.

In some examples, monitoring additional information related to users 16, such as context information, may also help credit allocation system 12 determine credit needs of users 16. For example, calendar information, email information (or other communication information), geolocation information, conference or event information, membership information, or the like of the plurality of users 16 of the shared line of credit may be used to determine the credit needs of the plurality of users 16. As one example, a calendar event indicating a user attending a conference, membership event, trade show, or the like may indicate the user may have an increased credit need. In other examples, additional or alternative information may indicate a credit need of one or more users of the plurality of users 16 of the shared line of credit.

Credit allocation system 12 includes a machine learning model configured to determine a plurality of credit needs of the plurality of users 16 of the shared line of credit. The machine learning model has been trained on historical data, which may include data similar to that monitored by credit allocation system 12. For example, the machine learning model may be trained on historical data including credit usage history, user data, context information, information relating to the corporation, or the like. Credit allocation system 12 is configured to apply the monitored data as input into the trained machine learning model so that the machine learning model can predict the credit needs of the plurality of users 16 of the shared line of credit. Credit allocation system 12 may use the information output from the machine learning model to determine if, how, and/or when credit of the shared line of credit should be reallocated. In some examples, the machine learning model may also output additional information relating to the credit reallocation. For example, the machine learning model may determine timing of the credit reallocation, such as, for example, if the credit reallocation should be permanent or temporary, when to reallocate the credit, how long the credit should be reallocated for (e.g., if temporary), or the like. In other examples, the machine learning model may determine additional or alternative information relating to the credit reallocation.

Figure 2:
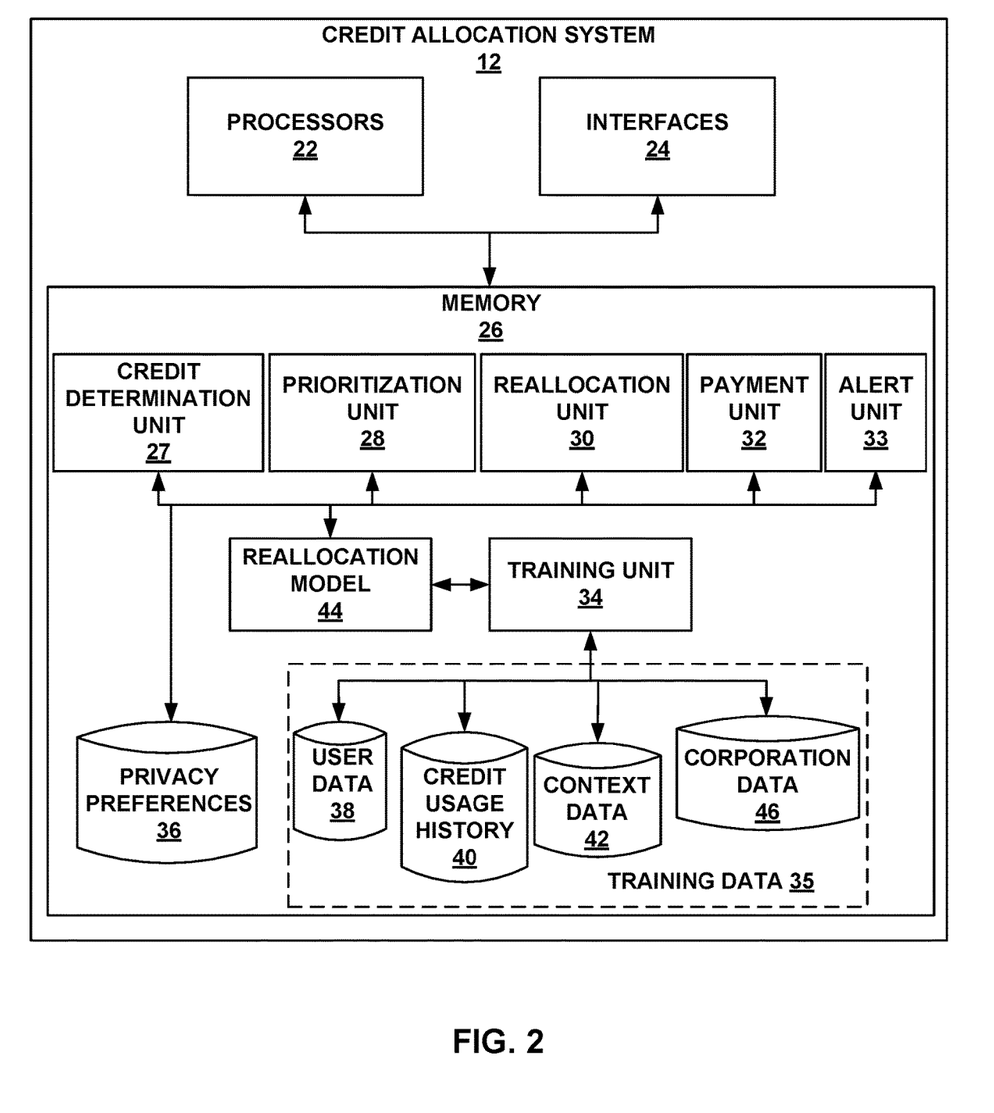
FIG. 2 is a block diagram illustrating the example credit allocation system of FIG. 1, in accordance with the disclosure.

FIG. 2 is a block diagram illustrating the example credit allocation system 12 of FIG. 1, in accordance with the disclosure. The architecture of credit allocation system 12 illustrated in FIG. 2 is shown for exemplary purposes only and credit allocation system 12 should not be limited to this architecture. In other examples, credit allocation system 12 may be configured in a variety of ways.

As shown in the example of FIG. 2, credit allocation system 12 includes one or more processors 22, one or more interfaces 24, and one or more memory units 26. Memory 26 of credit allocation system 12 includes credit determination unit 27, prioritization unit 28, reallocation unit 30, payment unit 32, alert unit 33, training unit 34, and reallocation model 35, which are executable by processors 22. Memory 26 also includes privacy preferences 36 and training data 35 (e.g., user data 38, credit usage history 40, context data 42, reallocation model, and corporation data 46). Each of the components, units, or modules of credit allocation system 12 are coupled (physically, communicatively, and/or operatively) using communication channels for inter-component communications. In some examples, the communication channels may include a system bus, a network connection, an inter-process communication data structure, or any other method for communicating data.

Processors 22, in one example, may include one or more processors that are configured to implement functionality and/or process instructions for execution within credit allocation system 12. For example, processors 22 may be capable of processing instructions stored by memory 26. Processors 22 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 26 may be configured to store information within credit allocation system 12 during operation. Memory 26 may include a computer-readable storage medium or computer-readable storage device. In some examples, memory 26 includes one or more of a short-term memory or a long-term memory. Memory 26 may include, for example, random access memories (RAM), dynamic random access memories (DRAM), static random access memories (SRAM), magnetic discs, optical discs, flash memories, or forms of electrically programmable memories (EPROM), or electrically erasable and programmable memories (EEPROM). In some examples, memory 26 is used to store program instructions for execution by processors 22. Memory 26 may be used by software or applications running on credit allocation system 12 (e.g., credit determination unit 27, prioritization unit 28, reallocation unit 30, payment unit 32, alert unit 33, training unit 34, and/or reallocation model 44) to temporarily store information during program execution.

Credit allocation system 12 may utilize interfaces 24 to communicate with external devices via one or more networks, e.g., private network 14 and/or the public network 18, or via wireless signals. Interfaces 24 may be network interfaces, such as Ethernet interfaces, optical transceivers, radio frequency (RF) transceivers, or any other type of devices that can send and receive information. Other examples of interfaces may include Wi-Fi, near-field communication (NFC), or Bluetooth® radios. In some examples, credit allocation system 12 utilizes interfaces 24 to communicate with an external device such as a server associated with credit issuer 20, server associated with private network 14, a user device associated with a user of the plurality of users 16, a user device associated with an administrator, or the like.

Credit determination unit 27 may monitor information relating to credit needs of the plurality of users 16 of the shared line of credit. For example, credit determination unit may monitor information such as, credit usage and/or context information (e.g., calendar information, email information, geolocation information, conference or event information, membership information, or the like). In other examples, credit determination unit 27 may monitor additional or alternative information relating to the plurality of users 16 or the corporation and/or business unit associated with the shared line of credit. For instance, credit determination unit 27 may monitor and/or determine a job function of a user, a business unit associated with the user, a type of corporation (e.g., a financial institution, a manufacturing company, a construction company, an oil company, a law firm, or any other suitable type of entity), a size of the corporation, spending habits of the corporation, a purchase cycle of the corporation, billing and/or invoice information, privacy rules of the corporation, or the like. Such monitored information may be used to determine credit needs for the plurality of users 16 of the shared line of credit.

In some examples, credit determination unit 27 may have restrictions on which users 16 can be monitored, or which information associated with specific users 16 can be monitored. For example, privacy preferences 36 may include privacy preferences of the plurality of users 16. As one example, privacy preferences 36 may indicate whether credit determination unit 27 is able to access information of a user of the plurality of users 16 that may not be associated with the corporation. For instance, privacy preferences 36 may indicate whether credit determination unit 27 has access to geolocation information, social media accounts, personal email, personal credit usage history, or the like of the plurality of users 16. In some examples, privacy preferences 36 indicates that credit determination unit 27 has access to geolocation information, social media accounts, personal email, personal credit usage history, or the like of a user of the plurality of users 16, may enable credit determination unit 27 to determine a more accurate credit need for the respective user in comparison to a user that does not allow credit determination unit 27 to access such information. As another example, privacy preferences 36 may indicate whether credit determination unit 27 can monitor calendar events of a respective user of the plurality of users. In other examples, privacy preferences 36 may include additional or alternative information.

Credit determination unit 27 is configured to determine one or more credit needs of the plurality of users 16. In some examples, credit determination unit 27 may compare a determined credit need of a user of the plurality of users 16 to a current credit amount of the respective user to determine whether the credit need of the user is greater than, less than, or equal to a current credit amount of the user. For example, credit determination unit 27 may determine that a first credit need of a first user is greater than a first current credit amount of the first user. As another example, credit determination unit 27 may determine that a second credit need of a second user is less than a second current credit amount of the second user. In other examples, credit determination unit 27 may determine that a credit need of a user of the plurality of users 16 is equal to a current credit amount of the respective user.

In some examples, credit determination unit 27 may determine credit needs of one or more of the plurality of users 16 using a reallocation model 44. For example, credit determination unit 27 may apply the monitored information (e.g., credit usage, context information, or the like) as input into reallocation model 44, and reallocation model 44 may determine the credit needs of the plurality of users 16 as output based on the input information. In some examples, reallocation model 44 may output the determined credit needs of the plurality of users 16 to credit determination unit 27.

In some cases, reallocation model 44 may be a machine learning model. In some examples, training unit 34 may train reallocation model 44 from a machine learning algorithm based on training data 35 including historical credit usage information related to the plurality of users of the shared line of credit and/or historical credit usage information related to the group to which the plurality of users belongs. More specifically, training data 35 may include, for example, previous months or years of user data 38, credit usage history 40, context data 42, and/or corporation data 46. The trained reallocation model 44 may be able to identify trends, patterns, insights, or the like based on input data that is similar to training data 35. For example, the patterns identified after the training of reallocation model 44 may include a plurality of patterns correlated with anticipated credit needs of the plurality of users 16. In this way, reallocation model 44 may identify a group of patterns based on the input data from credit determination unit 27 (e.g., the information monitored by credit determination unit 27), and each pattern of the group of patterns may have a known degree of influence on a credit need of a user (e.g., whether the pattern is likely to result in an increase or decrease in the future credit need of the respective user, and how much the pattern will affect the future credit need of the user, etc.). Using the patterns, reallocation model 44 determines the credit needs of the plurality of users 16. For example, reallocation model 44 may be trained to recognize that a pattern including purchase of a flight, hotel, and rental car may indicate that a user will be traveling in the future, which may result in the respective user having an increased credit need. Once the credit needs of the plurality of users has been determined, reallocation model 44 can output the predicted credit needs of one or more users of the plurality of users 16 to credit determination unit 27.

Training unit 34 may use training data 35 to train reallocation model 44 to determine the credit needs of the plurality of users 16. In some examples, training data 35 may include user data 38, credit usage history 40, context data 42, and/or corporation data 46 with known effects on a credit need of one or more users. For example, the training data may include user data 38, credit usage history 40, context data 42, and/or corporation data 46 that results in an increase in a credit need of a user, a decrease in a credit need of a user, that does not affect the credit need of a user, or the like. In some examples, training unit 34 may also train reallocation model 44 to identify fraudulent activity relating to the shared line of credit. In some such examples, training data 35 may further include user data 38, credit usage history 40, context data 42, and/or corporation data 46 that indicates fraudulent activity.

In some examples, user data 38 may include a job function of a user, a business unit associated with the user, or the like of one or more users of the plurality of users 16. In some examples, different job functions and/or business units may have different credit needs associated with them. For instance, a managerial position of a user may have a higher credit need in comparison to an entry level position of a user. As another example, a user affiliated with a sales business unit may have a higher credit need in comparison to a user affiliated with an engineering business unit. In other examples, job functions and/or business units associated with users of the plurality of users 16 may have additional or alternative effects on the credit needs of the plurality of users 16.

Credit usage history 40 may include credit usage history of the shared line of credit by the plurality of users 16. In some examples, as shown in FIG. 2, credit usage history 40 may be stored in memory 26 of credit allocation system 12. For example, credit allocation system 12 may receive or otherwise access the credit usage history of the plurality of users 16 from credit issuer 20 (e.g., using interfaces 24) and store the received data in credit usage history 40. Training unit 34 may use any suitable credit usage history 40 relevant to train reallocation model 44. As one example, credit usage history 40 may include purchase of a flight, hotel, and/or rental car that may indicate a user will be traveling in the future, which may mean that the user will have a higher credit need than usual. In some cases, credit usage history 40 may also indicate spending habits of a user. For example, training unit 34 may train reallocation model 44 to determine a period of time in which one or more users of the plurality of users 16 has an increased or decreased credit need. For instance, credit usage history 40 may include data that indicates a first user with increased spending, and therefore an increased credit need, over a period of time, such as a time of year (e.g., summer or winter), and a second user with decreased spending, and therefore a decreased credit need over a different period of time. As another example, training unit 34 may train reallocation model 44 to recognize a stability of a determined credit need (e.g., if the determined credit need is relatively long term).

Context data 42 may include information such as, for example, calendar information, email information (or other communication information), geolocation information, conference or event information, membership information, or the like with a known effect on a credit need of one or more users of the plurality of users 16. As one example, a calendar event may indicate that a user of the plurality of users 16 is traveling and/or is attending a conference or event, which may affect the credit need of the respective user. As another example, geolocation information of a user may indicate that the user is in a different location than usual, therefore demonstrating that the user may be traveling, which may affect the credit need of the respective user. As yet another example, context data 42 may indicate membership fees are due for a membership, which may indicate a user will have an increased credit need. In other examples, context data 42 may include additional or alternative information with a known effect on a credit need of one or more users 16.

Corporation data 46 may include data about the corporation that may affect a credit need of one or more users 16 of the shared line of credit. Corporation data 46 may include a type of the corporation (e.g., a financial institution, a manufacturing company, a construction company, an oil company, a law firm, or any other suitable type of enterprise), a size of the corporation, spending habits of the corporation, a purchase cycle of the corporation, billing and/or invoice information, or the like. In some examples, such corporation data 46 may influence the credit needs of one or more users of the plurality of users 16. For example, the purchase cycle of the corporation may affect how much credit a user has access to or how much credit can be reallocated from a ghost account to a user. Moreover, in some examples, training unit 34 may create reallocation model 44 based on corporation data 46, such as, for example, a type or size of the corporation. For instance, training unit 34 may train reallocation model 44 based on corporation data 46 from similar (e.g., in type or size) corporations or entities. In other examples, corporation data 46 may include additional or alternative information relating to the corporation that has a known effect on one or more credit needs of the respective users of the plurality of users 16.

In some cases, training unit 34 may access privacy preferences 36 to determine whether training data 35 relating to certain users of the plurality of users 16 can be accessed by training unit 34 to train reallocation model 44. For instance, privacy preferences 36 may indicate whether training unit 34 is able to access training data 35 from or associated with a specific user of the plurality of users 16. Additionally, or alternatively, privacy preferences 36 may include privacy preferences of one or more other corporations or entities. For example, in some cases training data 35 may include data from or related to entities other than the corporation for which credit allocation system 12 is managing the credit allocation. In some such examples, training unit 34 may train reallocation model 44 using training data 35 of the other entities that are similar to the corporation associated with credit allocation system 12. Privacy preferences 36 may indicate whether training unit 34 is able to access training data 35 from or associated with a specific entity to use for training reallocation model 44 of the corporation (e.g., use another entity's data to train reallocation model 44).

In some examples, training data 35 may be specific to a job function and/or business unit. For example, such as in cases in which the shared line of credit is associated with a business unit rather than for the entire corporation, training unit 34 may train reallocation model 44 using training data 35 that is specific to the business unit the shared line of credit is associated with rather than training data 35 relating to the corporation as a whole. In this way, reallocation model 44 may be more accurate, therefore the determined credit needs of the plurality of users 16 may also be more accurate. In a similar manner, reallocation model 44 may be trained based on a certain job function, such as, for example, if the plurality of users 16 of the shared line of credit all have the same or a similar job function. In other examples, training unit 34 may use any suitable training data 35, specific to different configurations or not, to train reallocation model 44.

In some examples, training unit 34 may apply training data 35 to a machine learning algorithm, such as a recurrent neural network (RNN), to create reallocation model 44 used by credit determination unit 27 to determine one or more credit needs of one or more users of the plurality of users 16. The RNN may identify patterns and relationships associated with user data 38, credit usage history 40, context data 42, and/or corporation data 46 of training data 35. In other examples, training unit 34 may apply training data 35 to a different machine learning algorithm, such as, for example, a Bayesian algorithm, a Clustering algorithm, a decision-tree algorithm, a regularization algorithm, a regression algorithm, an instance-based algorithm, an artificial neural network algorithm, a deep learning algorithm, a dimensionality reduction algorithm, or the like to create reallocation model 44.

In some examples, reallocation model 44 may be periodically retrained by training unit 34. For example, reallocation model 44 may be initially created by training unit 34 based on training data 35 including a first training data set (e.g., a first set of user data 38, credit usage history 40, context data 42, and/or corporation data 46), and training unit 34 may retrain reallocation model 44 when appropriate using a second training data set (e.g., a second set of user data 38, credit usage history 40, context data 42 and/or corporation data 46). In some examples, the second training data set may include some or all of the training data included in the first training data set with at least some data not included in the first training data set. In other examples, the second training data set may not include any training data of the first training data set (e.g., all new training data). In any case, training unit 34 may retrain reallocation model 44 using the second training data set. After reallocation model 44 has been retrained, reallocation model 44 may be different that the previous reallocation model trained using the first training data set.

In some examples, training unit 34 retrains reallocation model 44 on regular time intervals (e.g., monthly, bi-monthly, yearly, or the like). In other examples, training unit 34 may retrain reallocation model on an irregular basis, such as based on reduced accuracy of reallocation model 44. For instance, if the accuracy of reallocation model 44 is determined to be reduced, reallocation model 44 may be retrained using new data to better fit particular needs and/or patterns of the corporation. For example, training unit 34 may retrain reallocation model 44 if credit allocation system 12 receives a credit adjustment request without having determined to reallocate credit to or from the user requesting the credit adjustment. As another example, if a user exceeds his or her credit limit, training unit 34 may retrain reallocation model 44. Such examples may indicate that reallocation model 44 has reduced accuracy. In other examples, additional or alternative situations may also indicate that reallocation model 44 may have reduced accuracy, which may trigger the retraining of reallocation model 44 by training unit 34.

In some examples, training unit 34 monitors the accuracy of reallocation model 44. For example, the various data included in training data 35 used by training unit 34 to train reallocation model 44 may affect a credit need of one or more users of the plurality of users 16 in an identifiable way. As one example, training data 35 that includes context data 42 indicating a membership fee due for a user of the plurality of users 16 may indicate that the said user will have an increased credit need. Thus, the various identifiable data of the training data may be applied (e.g., "tested") on reallocation model 44, and training unit 34 may determine a fraction of data in which reallocation model 44 correctly determines a classification (e.g., increases one or more credit needs, decreases one or more credit needs, or no effect on one or more credit needs, how much one or more credit needs are effected, fraudulent or non-fraudulent activity, etc.) of the respective user data 38, credit usage history 40, context data 42, corporation data 46, or combinations thereof. In some examples, the fraction may represent a measured accuracy of reallocation model 44. In some cases, data other than training data 35 may be used to determine the accuracy of reallocation model 44. In such examples, the data used to determine the accuracy of reallocation model 44 may have a known effect on one or more users' credit needs so that training unit 34 can determine whether reallocation model 44 predicted the correct outcome of the credit needs. In some cases, if the measured accuracy of reallocation model 44 decreases, training unit 34 may retrain reallocation model 44.

Additionally, or alternatively, feedback information from one or more users of the plurality of users 16 may indicate that reallocation model 44 has reduced accuracy. For example, in some cases, credit allocation system 12 may prompt the plurality of users 16 for feedback relating to the credit allocation by credit allocation system 12, such as, whether the credit allocation has been sufficient for the user's actual credit needs, relating to the efficiency of the credit needs (e.g., was the credit reallocated for an anticipated credit need in time), whether an increase or decrease in credit allocated to the user was warranted or erroneous, or the like. In some such examples, training unit 34 may use such information to help determine the accuracy of reallocation model 44, determine if reallocation model 44 needs to be retrained, or both.

In some cases, reallocation model 44 may be trained based on different priorities, such as priorities based on user preferences or feedback. For example, training unit 34 may train reallocation model 44 based on user-defined priorities such as reducing an amount of declined credit authorizations (e.g., for the corporation as a whole or for a select group of users of the shared line of credit), reducing an interest rate, increasing liquidity in an account, meeting target credit amounts for specific users, or the like. In some examples, a user (e.g., an administrator) may be able to select which parameters reallocation model 44 is trained to prioritize. In other examples, reallocation model 44 may be trained to recognize which parameters are likely to be higher priorities to the corporation and/or administrator.

In some examples, credit allocation system 12 may enable an administrator or another user to modify or manage credit amounts of the plurality of users 16. Additionally, or alternatively, an administrator may be able to input information, such as a target credit amount for a user of the plurality of users 16, into reallocation model 44, and reallocation model 44 may determine the effects of such inputs on other users of the plurality of users 16. As one example, the administrator may be able to access an interface that enables the user to move a slider to select a target credit amount for one or more users of the shared line of credit. The target credit amount may be used as input for reallocation model 44, and reallocation model 44 may output the effect of such a target credit amount on the credit amounts of other users. For example, reallocation model 44 may determine how the adjustment to the user's credit amount to the target credit amount will affect other users' credit and suggest a credit allocation scheme for the other users based on the target credit amount of the user. The interface may be configured to present the recommended credit allocations for the other users of the shared line of credit. For instance, if the administrator selects a target credit amount (e.g., using the slider) for a user, the interface may dynamically present recommended credit allocation schemes for the plurality of users 16 based on the target credit amount. Additionally, or alternatively, the interface may present other accounts that the credit reallocation or target credit amount may affect, such as other lines of credit and/or deposit accounts.

Credit determination unit 27 may also be able to determine a current credit amount of one or more users of the plurality of users 16. For example, the current credit amounts of the plurality of users 16 may be stored in memory 26. Additionally, or alternatively, credit determination unit 27 may be able to determine the current credit amount of the plurality of users 16 from credit issuer 20 (e.g., using interfaces 24). In some examples, the current credit amounts of the plurality of users 16 may be known amounts that do not need to be calculated (e.g., reallocation model 44 does not need to be used to determine the current credit amounts). In this way, credit determination unit 27 determines one or more credit needs of one or more respective users of the plurality of users 16 by applying the monitored information as input into reallocation model 44 and can compare the determined one or more credit needs as output from reallocation model 44 to respective current credit amounts of the one or more users. In turn, credit determination unit 27 may determine whether a credit need of a user is greater than, less than, or equal to a current credit amount of each user of the plurality of users 16. In some such examples, credit determination unit 27 may also determine a difference between the determined credit need and current credit amount of a respective user.

In some examples, if credit determination unit 27 determines that at least a first user of the plurality of users 16 has a credit need that is greater than his or her current credit amount, prioritization unit 28 may determine how to reallocate the credit (e.g., to at least the first user). For instance, if credit determination unit 27 determines that at least the first user of the plurality of users 16 has a first credit need greater than a first current credit amount, credit determination unit 27 may alert prioritization unit 28 of the increased credit need so that prioritization unit 28 can analyze one or more of the plurality of credit needs of the other users of the shared line of credit provided by reallocation model 44 and determine how the credit should be reallocated (e.g., from another user of the plurality of users 16, from a ghost account, by paying off at least a portion of the used credit, or the like) based on the analysis.

In some examples, reallocation model 44 may be configured to predict a period of time and/or stability of the predicted credit needs of the plurality of users 16. For instance, reallocation model 44 may determine a period of time that a user of the plurality of users 16 may have a predicted increased credit need. Reallocation model 44 may also predict the stability of the anticipated credit needs, such as, for example, whether the credit need will be applicable for a relatively long period of time. For example, a user with a historically relatively low credit need may also historically have a credit need less than a current amount of credit, such that it is relatively unlikely for the user to need an increased credit amount. In other examples, reallocation model 44 may be able to use other indications to determine a period of time and/or stability of a credit need of the plurality of users 16.

In some cases, prioritization unit 28 may use the periods of time and/or stabilities predicted by reallocation model 44 in order to determine how to reallocate the credit. In such cases, the use of the additional predictions by reallocation model 44 may enable the reallocation of credit by credit allocation system 12 more stable, accurate, and/or efficient than some other credit allocation systems. For example, the time periods and/or stability predictions by reallocation model 44 may indicate what users do or do not need credit the most, whether the anticipated credit needs are likely to be stable or unstable, how long a user may have an increased or decreased credit need, or the like, which may enable credit allocation system 12 to be more efficient, accurate, stable, or the like in comparison to credit allocation by a different system or by an administrator. In turn, users may be less likely to exceed their credit limit or have a relatively large amount of unused credit. Moreover, credit determination unit 27 and prioritization unit 28 may operate automatically such that users of the plurality of users 16 have access to an appropriate amount of credit without having to explicitly request credit adjustments.

Prioritization unit 28 may use the additional predictions by reallocation model 44 to determine how to reallocate the credit between users of the plurality of users 16. For example, prioritization unit 28 may look for longer periods of time and/or more stable predictions related to the credit needs of the plurality of users 16 to determine which users to reallocate credit to or from. In some examples, prioritization unit 28 may use prioritization scale in order to determine how to reallocate the credit of the shared line of credit between the plurality of users 16. For example, prioritization unit 28 may be more likely to reallocate credit to a first user with a first credit need that is greater than a first current credit amount from a second user that historically has a second credit need less than a second current credit amount (e.g., a relative stable and/or permanent reallocation). In this way, reallocation unit 30 may permanently reallocate the credit to the first user from the second user, and credit allocation system 12 may be less likely to have to reallocate the credit back to the second user after the first user's anticipated increased credit need has passed. Thus, prioritization unit 28 may rank the second user higher (e.g., to reallocate from) than a third user that sometimes has a third credit need that is greater than a third current credit amount, even if the third credit need is currently less than the third current credit amount, as the third user may be more likely to need to have the credit reallocated back to them. In other examples, prioritization unit 28 may identify other relatively permanent ways to reallocate the credit based on the time period and/or stability predictions by reallocation model 44.

In some examples, a relatively permanent solution may not be readily available. In some such examples, prioritization unit 28 may look for a relatively long-term credit reallocation scheme based on the predictions by reallocation model 44. For example, if reallocation model 44 predicts that a first user has a first credit need greater than a first current credit amount during a first period of time and a second user has a second credit need less than a second current credit amount during the first period of time, prioritization unit 28 may determine that reallocation unit 30 should temporarily reallocate credit from the second user to the first user during the first period of time. As a specific example, a first user may use his or her portion of the shared line of credit frequently in the summer, but may not use the credit the remainder of the year. Similarly, a second user may use his or her portion of the shared line of credit all year except for the summer. Thus, using such determinations by reallocation model 44, prioritization unit 28 may determine that credit should be temporarily reallocated to the first user from the second user in the summer, and reallocated back to the second user for the fall, winter, and spring. In other examples, prioritization unit 28 may identify other relatively long-term ways to reallocate the credit based on the analysis of the credit needs and current credit amounts of the plurality of users 16 and the predictions by reallocation model 44.

In some cases, prioritization unit 28 may determine to reallocate the credit in a relatively dynamic manner. For example, prioritization unit 28 may determine that the credit should be reallocated in real-time or near real-time based on when credit determination unit 27 determines that the credit is likely to be needed. For instance, reallocation model 44 may determine that a user of the plurality of users 16 has an increased credit need next week, and prioritization unit 28 may determine that credit should not be reallocated to the user until the time period of the increased credit need. In this way, in some examples, prioritization unit 28 may continuously or substantially continuously rank the respective credit needs of the users of the plurality of users 16 as determined by reallocation model 44 based on the monitored information by credit determination unit 27 to determine how the credit should be reallocated, which in some cases may be on a relatively small time scale (e.g., per second, per minute, per hour, per day, or the like). In some such examples, reallocating credit based on a relatively small time scale and/or in a relatively dynamic manner may enable the corporation to utilize a smaller shared line of credit. Additionally, or alternatively, in some cases, prioritization unit 28 may determine that credit should be reallocated back to original users after an anticipated credit need of another user has passed. For instance, prioritization unit 28 may determine that the credit should be allocated to a first user from a second user, and then returned to the second user after the first user no longer needs the increased credit amount, such as, for example, if reallocation model 44 indicates that the decreased credit need of the second user may be relatively unstable (e.g., the second user may have an increased credit need in the future). In other examples, prioritization unit 28 may determine other ways to implement a relatively dynamic credit reallocation scheme.

Moreover, in some examples, prioritization unit 28 may use a combination of relatively permanent, long-term, or dynamic reallocation schemes. For instance, for a first user and a second user, prioritization unit 28 may determine a relatively permanent reallocation scheme (e.g., a permanent reallocation); for a third user and a fourth user, prioritization unit 28 may determine a relatively long-term reallocation scheme (e.g., a temporary reallocation based on time periods); and for a fifth user and a sixth user, prioritization unit 28 may determine a relatively dynamic reallocation scheme (e.g., may reallocate to and from each user more than once) based on the time period and/stability predictions of reallocation model 44. In this way, prioritization unit 28 may determine a reallocation scheme that best fits with preferences of the corporation and/or users of the plurality of users 16, as well as being quick, accurate, and not significantly disruptive.

Regardless of whether prioritization unit 28 uses a relatively permanent reallocation scheme, long-term reallocation scheme, dynamic reallocation scheme, or combinations thereof, prioritization unit 28 may utilize any appropriate prioritization scale of the respective credit needs of the plurality of users 16, of respective users of the plurality of users 16, or the like in order to determine how to reallocate the credit. In some examples, prioritization unit 28 may use a weighting system including any suitable factors to determine ranks of the plurality of users 16. For example, the ranking of the plurality of users 16 may depend on a weight of a level within the corporation of respective users, a severity of the credit need, an amount of the credit need, a time period for the credit need, a stability of the credit need, or the like. In other examples, prioritization unit 28 may rank the plurality of users 16 in a different manner. By ranking the plurality of users 16 (or using another prioritization scale), prioritization unit 28 may be able to view the shared line of credit (e.g., the plurality of users 16, ghost accounts, payment schedule, or any other information related to the shared line of credit) as a whole so that the credit can be reallocated on an overall basis rather than on a user-by-user basis. In other words, prioritization unit 28 may be able to determine allocation schemes for the plurality of the users 16 such that each user has access to an appropriate amount of credit, which may enable credit allocation system 12 to be more efficient, more accurate, more automatic, and less disruptive than other credit allocation systems or credit allocation performed by an administrator based on received credit adjustment requests.

In some examples, credit determination unit 27 and/or prioritization unit 28 may be configured to determine a credit allocation scheme for a new user (e.g., a user that did not previously have any credit of the shared line of credit). In some such examples, credit determination unit 27 may be able to apply information related to the new user to reallocation model 44 to determine a credit need of the new user, which may enable credit determination unit 27 to determine how much credit to allocate to the new user. Additionally, or alternatively, credit determination unit 27 may determine an amount of credit for the new user that is the same or similar to a current credit amount of a user similar to the new user, such as, for example, in the same business unit, that has the same job function, or the like. Prioritization unit 28 may determine from where to reallocate the credit to the new user (e.g., from one or more other users or from a ghost account).

Based on the analysis of the credit needs of the other users of the plurality of users 16 and the reallocation scheme determined by credit determination unit 27 and prioritization unit 28, reallocation unit 30 may reallocate credit from the shared line of credit to at least the first user with the first credit need greater than the first current amount. In some examples, reallocation unit 30 may notify an accounting system of the credit reallocation. For example, reallocation unit 30 may notify the accounting system configured to manage and/or track the shared line of credit so that the accounting system can record an updated current credit amount for each user of the plurality of users 16 that has had credit reallocated based on the credit reallocation scheme. Additionally, or alternatively, reallocation unit 30 may inform credit issuer 20 of the updated current credit amounts of the plurality of users 16 as determined by prioritization unit 28. In some cases, reallocation unit 30 may request approval from credit issuer 20 and/or an administrator prior to reallocating the credit and/or recording the change with an accounting system and/or credit issuer 20. In other examples, reallocation unit 30 may reallocate credit in a different way. In any case, reallocation of credit by reallocation unit 30 may enable the users of the plurality of users 16 to have access to and use the updated current credit amount.

As one example, the reallocation of credit to the first user by reallocation unit 30 may provide the first user with a first updated credit amount that is greater than or equal to the first credit need of the first user as determined by credit determination unit 27. In turn, the first user may be less likely to exceed the updated credit amount, without the first user having to request a credit adjustment in order to receive the updated credit amount. Reallocation unit 30 may also reallocate credit from a user of the plurality of users 16. In this way, reallocation unit 30 may allocate credit to and from users of the plurality of users 16, as well as to and from a ghost account, as determined by prioritization unit 28. In some examples, such as if training unit 34 determines that the accuracy of reallocation model 44 is reduced, reallocation unit 30 may reallocate credit such that one or more updated credit amounts of one or more of the plurality of users 16 exceeds the respective credit needs of the one or more users by a buffer credit amount (e.g., in case the actual credit need of the user is higher than the determined credit need of the user).

Additionally, or alternatively, prioritization unit 28 may determine to pay off at least a portion of used credit of the shared line of credit to have access to additional credit for allocation to users of the plurality of users 16. In some such examples, payment unit 32 may be configured to submit a payment of at least the portion of the used credit. For example, payment unit 32 may use funds from a different account associated with the corporation to submit a payment to credit issuer 20. For example, payment unit 32 may use funds from another credit line, a deposit account, or another funding source. In some examples, reallocation unit 30 may reallocate credit as determined by prioritization unit 28 after payment unit 32 has submitted a payment and there is a larger portion of the shared line of credit available for reallocation.

In some examples, credit determination unit 27 may additionally be able to identify fraudulent activities of the plurality of users 16 using reallocation model 44. For example, reallocation model 44 may be trained to recognize patterns or trends that may indicate a user is using his or her portion of the shared line of credit in a fraudulent manner, such as using the shared line of credit for personal use. In some such examples, prioritization unit 28 may determine to allocate funds from the identified bad actor so that the user has less credit available for the fraudulent transactions, and reallocation unit 30 may reallocate the funds from the bad actor accordingly based on the reallocation scheme determined by prioritization unit 28.

Credit allocation system 12 may operate periodically or continuously. In some examples, credit allocation system 12 may operate in real-time or near real-time. For example, credit determination unit 27 may continuously monitor information relating to the shared line of credit, and continuously input such monitored information to reallocation model 44 to determine credit needs of the plurality of users 16 in real-time or near real-time. Similarly, prioritization unit 28 may relatively quickly determine a reallocation scheme, which may be executed by reallocation unit 30 shortly thereafter. In other examples, credit allocation system 12 may monitor information related to the shared line of credit, determine credit needs, determine current credit amounts, analyze credit needs, determine reallocation schemes, reallocate credit, and/or submit payments on a periodic basis. For example, credit allocation system 12 may operate every minute, hour, day, week, or any other regular or irregular time basis. In yet other examples, credit allocation system 12 may operate both periodically and continuously. For instance, credit determination unit 27 may continuously monitor information related to the shared line of credit, and reallocation unit 30 may reallocate the credit as determined by prioritization unit 28 on a periodic basis. In some examples, real-time credit reallocation may be triggered by a user reaching or exceeding his or her current credit amount. In some such examples, reallocation unit 30 may reallocate credit to the user after the current credit amount was reached or exceeded (e.g., after a credit authorization was denied). After the reallocation, credit allocation system 12 may prompt the user to resubmit the credit authorization request (e.g., complete the previously denied transaction). In this way, the user may still be able to complete the transaction without having to wait a relatively long period of time to have the credit reallocated, such as by an administrator or another system after submitting a credit adjustment request.

In some examples, credit allocation system 12 may include alert unit 33 configured to notify an administrator about the credit allocation changes made by reallocation unit 30, or to prompt the administrator for approval regarding a proposed credit reallocation scheme determined by prioritization unit 28. In some such examples, alert unit 33 may be configured to send the alert or approval prompt to an administrator device (e.g., via interfaces 24). In some examples, alert unit 33 may use information in privacy preferences 36 to determine whether to alert the administrator about a change, prompt the administrator for approval of a credit allocation, or the like. For example, privacy preferences 36 may indicate that alert unit 33 should alert the administrator if the credit allocation meets certain criteria, such as a credit need exceeding a predetermined limit or if prioritization unit 28 determined to pay off at least a portion of the shared line of credit. For instance, privacy preferences 36 may indicate that reallocation unit 30 can automatically reallocate credit needs up to $10,000 (e.g., without administrator approval), but reallocation for credit needs greater than $10,000 may require administrator approval prior to reallocation unit 30 reallocating the credit. Thus, in such cases, alert unit 33 may prompt the administrator for approval prior to reallocation unit 30 reallocating the credit. Similarly, in some examples, alert unit 33 may prompt an administrator for approval prior to payment unit 32 paying off at least a portion of the used credit of the shared line of credit.

In some cases, alert unit 33 may also notify one or more users of the plurality of users 16 of a change in the credit allocation by credit allocation system 12 (e.g., on a user device via interfaces 24). In some examples, alert unit 33 may present a visual indication of the credit reallocation such that an administrator or user can quickly and easily identify the one or more changes made by (or to be made by) credit allocation system 12. In some examples, alert unit 33 may also be configured to alert an administrator of potential fraudulent activity of one or more users of the plurality of users 16.

Figure 3:
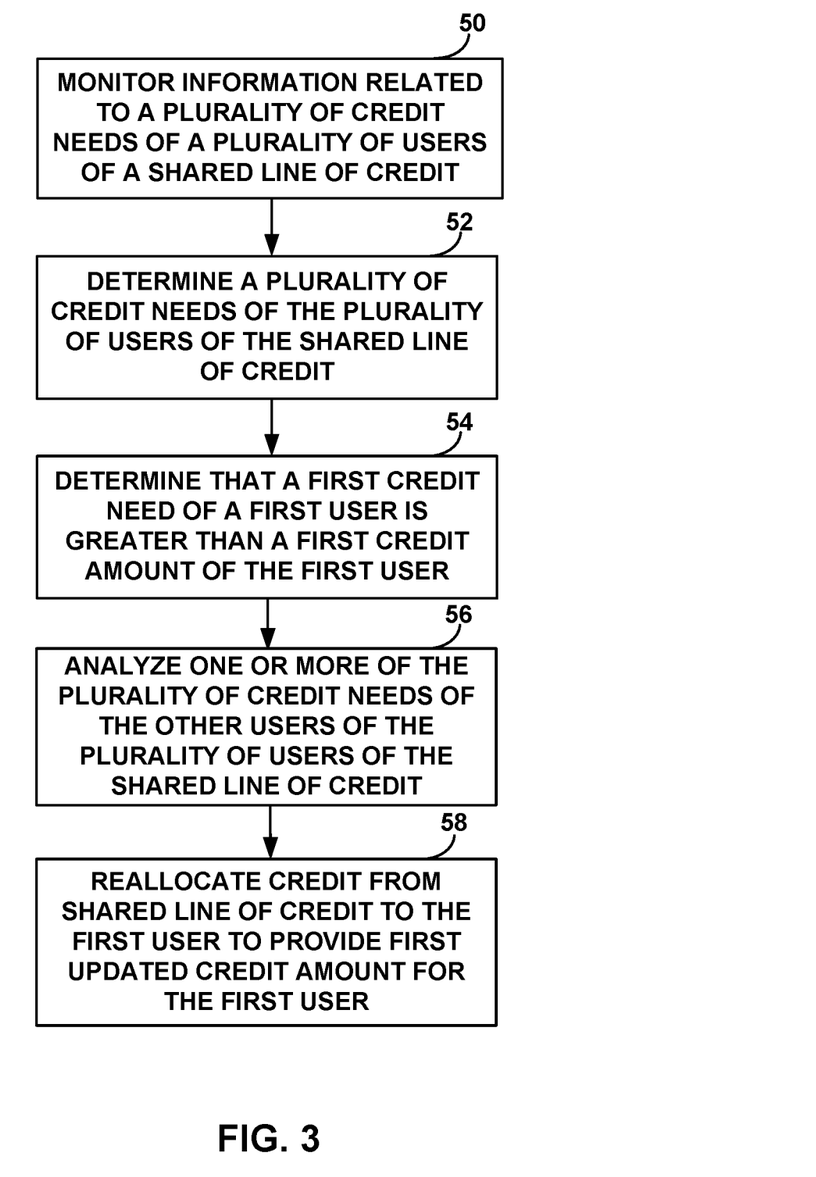
FIG. 3 is a flow diagram illustrating an example technique of reallocating credit of a shared line of credit to a user of the shared line of credit, in accordance with the disclosure.

FIG. 3 is a flow diagram illustrating an example technique of reallocating credit of a shared line of credit to a user of the shared line of credit, in accordance with the disclosure. The technique of FIG. 3 will be described with respect to credit allocation system 12 of FIG. 2 for ease of description only. In other examples, other systems may be used to perform the technique of FIG. 3.

The technique of FIG. 3 includes credit determination unit 27 monitoring information related to a plurality of credit needs of the plurality of users 16 of the shared line of credit (50). For example, credit determination unit 27 may monitor information such as credit usage, calendar information, email information, geolocation information, conference or event information, membership information, or other information of the plurality of users 16 of the shared line of credit.

Credit determination unit 27 may determine a plurality of credit needs of the plurality of users 16 of the shared line of credit (52). For example, credit determination unit 27 may input the monitored information into reallocation model 44, and reallocation model 44 may output the determined credit needs of the plurality of users 16 to credit determination unit 27. In some examples, credit determination unit 27 may also compare one or more of the plurality of credit needs to respective current credit amounts of the plurality of users 16. For example, credit determination unit 27 may determine that a first credit need of a first user of the plurality of users 16 is greater than a first current credit amount of the first user (54). In some cases, to determine that the first credit need of the first user is greater than the first current credit amount of the first user, credit determination unit 27 determines the first credit need of the first user based on the monitored information using reallocation model 44, determines the first current credit amount of the first user based on stored and/or access current credit amounts, and compares the determined first credit need to the first current credit amount of the first user.

Based on the determination by credit determination unit 27 that at least the first user has a first credit need that exceeds the first current credit amount, prioritization unit 28 may analyze one or more of the plurality of credit needs of the other users of the plurality of users 16 of the shared line of credit (56). In this way, prioritization unit 28 may determine how the credit should be reallocated. For example, prioritization unit 28 may determine where the additional credit for at least the first user with the first credit need that is greater than the first current credit amount should be reallocated from. As one example, prioritization unit 28 may analyze the other users of the plurality of users 16 to identify a second user of the plurality of users 16 that has a second credit need less than a second current amount as indicated by credit determination unit 27. Prioritization unit 28 may then determine to reallocate credit from the second user to the first user. In other examples, prioritization unit 28 may analyze the other users of the plurality of users 16 and identify a second user of the plurality of users 16 that has a second credit need greater than or equal to a second current amount based on the determination by credit determination unit 27. In some such examples, prioritization unit 28 may determine not to reallocate credit from the second user to the first user, and may instead identify a third user of the plurality of users 16 with a third credit need less than a third current credit amount of the third user to reallocate credit from. In other examples, prioritization unit 28 may determine to reallocate credit to the first user in a different way. As one example, prioritization unit 28 may determine to pay off some or all of the shared line of credit.

In some examples, prioritization unit 28 may determine how to reallocate the credit of the shared line of credit based on a prioritization scale of one or more credit needs of the plurality of credit needs of the other users of the plurality of users 16 or another parameter. In some such examples, the prioritization scale may be based on the permanence, stability, and/or length of a credit reallocation to the first user, which may be determined by reallocation model 44. For example, in some cases, reallocation model 44 may determine that a second credit need of a second user is historically less than a second current credit amount of the second user based on the monitored information. In some such examples, prioritization unit 28 may determine to permanently reallocate the credit from the second user to the first user. As an additional example, reallocation model 44 may determine that a second credit need of a second user is less than a second current credit amount of the second user during a period of time based on the monitored information, and prioritization unit 28 may then determine to temporarily reallocate the credit from the second user to the first user during the period of time.

In any case, the technique of FIG. 3 further includes reallocation unit 30 reallocating credit from the shared line of credit to the first user based on the analysis to provide a first updated credit amount for the first user (58). The first updated credit amount is greater than or equal to the first determined credit need of the first user such that the first user has a sufficient amount of available credit for his or her anticipated credit needs as determined by credit determination unit 27. Reallocation unit 30 may reallocate credit to the first user in any suitable manner based on the analysis by prioritization unit 28. For instance, reallocation unit 30 may reallocate credit to the first user from a second user, a third user, two or more users, a ghost account, or any combinations thereof. Reallocation unit 30 may provide the updated current credit amounts to and/or request approval of the updated current credit amounts from an accounting system, credit issuer 20, and/or an administrator. Additionally, or alternatively, payment unit 32 may be configured to submit a payment for at least a portion of used credit of the shared line of credit. In some such examples, reallocation unit 30 may reallocate credit to the first user after the payment has been submitted by payment unit 32.

In some examples, the technique of FIG. 3 may further include training unit 34 training reallocation model 44. For example, reallocation model 44 may include a machine learning model, and training unit 34 may train reallocation model 44 based on training data 35 including user data 38, credit usage history 40, context data 42, and/or corporation data 46. Additionally, or alternatively, training unit 34 may train reallocation model 44 based on data of other entities (e.g., other entities similar in type or size to the corporation). Training unit 34 may also retrain reallocation model 44. For example, training unit 34 may monitor the accuracy of reallocation model 44 and retrain reallocation model 44 when the accuracy of reallocation model 44 is determined to be reduced.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers.

Combinations of the above should also be included within the scope of computer-readable media.

Instructions may be executed by one or more processors, such as one or more DSPs, general purpose microprocessors, ASICs, FPGAs, or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   allocating, by a computer system, credit from a shared line of credit to a plurality of users of the shared line of credit to provide a respective current credit amount for each user of the plurality of users;
   monitoring, by the computer system, information related to a plurality of credit needs of the plurality of users of the shared line of credit, wherein the monitored information at least includes credit usage history and context information that indicate potential upcoming purchases by each user of the plurality of users;
   predicting, by the computer system and based on the monitored information, the plurality of credit needs of the plurality of users of the shared line of credit, wherein a respective credit need of each user includes the indicated potential upcoming purchases by each user of the plurality of users;
   determining, by the computer system, that a first credit need of a first user of the plurality of users is greater than a first current credit amount of the first user;
   analyzing, by the computer system, the respective credit needs of other users of the plurality of users of the shared line of credit, wherein analyzing the respective credit needs of the other users comprises determining that at least one respective credit need of at least one of the other users is less than the respective current credit amount of the at least one of the other users;
   reallocating, by the computer system, credit from the at least one of the other users of the plurality of users of the shared line of credit to the first user based on the analysis to provide a first updated credit amount for the first user, wherein the first updated credit amount is greater than or equal to the first credit need of the first user; and
   creating a credit reallocation model including training a machine learning algorithm based on historical credit usage information related to the plurality of users of the shared line of credit and historical credit usage information related to a group that includes the plurality of users,
   wherein predicting the plurality of credit needs of the plurality of users of the shared line of credit comprises:
   applying the monitored information as input to the credit reallocation model; and
   predicting the plurality of credit needs of the plurality of users as output from the credit reallocation model.

2. The method of claim 1, wherein creating the credit reallocation model comprises creating the credit reallocation model including training the machine learning algorithm based on one or more user-defined priorities.

3. The method of claim 1, wherein determining that the first credit need of the first user is greater than the first current credit amount of the first user comprises:
   comparing the first credit need of the first user to the first current credit amount of the first user.

4. The method of claim 1,
   wherein analyzing the respective credit needs of the other users of the shared line of credit comprises determining that a second credit need of a second user of the plurality of users of the shared line of credit is less than a second current credit amount of the second user; and
   wherein reallocating the credit from the at least one of the other users of the shared line of credit to the first user comprises reallocating credit from the second user to the first user to provide the first updated credit amount for the first user.

5. The method of claim 4,
   wherein determining that the second credit need of the second user is less than the second current credit amount of the second user further comprises determining that the second credit need of the second user is historically less than the second current credit amount of the second user based on the monitored information; and
   wherein reallocating credit from the second user to the first user comprises permanently reallocating the credit from the second user to the first user.

6. The method of claim 4,
   wherein determining that the second credit need of the second user is less than the second current credit amount of the second user further comprises determining that the second credit need of the second user is less than the second current credit amount of the second user during a period of time based on the monitored information; and
   wherein reallocating credit from the second user to the first user comprises temporarily reallocating the credit from the second user to the first user during the period of time.

7. The method of claim 1, wherein analyzing the respective credit needs of the other users of the shared line of credit comprises:
   determining that a second credit need of a second user of the plurality of users of the shared line of credit is greater than or equal to a second current credit amount of the second user;
   determining not to reallocate credit from the second user to the first user;
   determining that a third credit need of a third user of the plurality of users of the shared line of credit is less than a third current credit amount of the third user;

determining that a fourth credit need of a fourth user of the plurality of users of the shared line of credit is less than a fourth current credit amount of the fourth user; and wherein reallocating credit from the at least one of the other users of the shared line of credit to the first user comprises reallocating credit from both the third user and the fourth user to the first user to provide the first updated credit amount for the first user.

8. The method of claim 1, wherein analyzing the respective credit needs of the other users of the shared line of credit comprises prioritizing the respective credit needs of the other users, and wherein reallocating credit from the at least one of the other users of the shared line of credit to the first user to provide the first updated credit amount for the first user is based on the prioritization of the respective credit needs of the other users of the shared line of credit.

9. The method of claim 1, wherein the monitored information comprises at least one of recent credit usage, calendar information, email information, communication information, geolocation information, conference or event information, invoice information, billing information, or membership information for each of the plurality of users of the shared line of credit.

10. The method of claim 1, wherein reallocating the credit from the at least one of the other users of the shared line of credit to the first user includes paying off at least a portion of the shared line of credit.

11. A credit allocation system comprising:
a memory;
one or more processors in communication with the memory and configured to:
allocate credit from a shared line of credit to a plurality of users of the shared line of credit to provide a respective current credit amount for each user of the plurality of users;
monitor information related to a plurality of credit needs of the plurality of users of the shared line of credit, wherein the monitored information at least includes credit usage history and context information that indicate potential upcoming purchases by each user of the plurality of users;
predict, based on the monitored information, the plurality of credit needs of the plurality of users of the shared line of credit, wherein a respective credit need of each user includes the indicated potential upcoming purchases by each user of the plurality of users;
determine that a first credit need of a first user of the plurality of users is greater than a first current credit amount of the first user;
analyze the respective credit needs of other users of the plurality of users of the shared line of credit, wherein the one or more processors are configure to determine that at least one respective credit need of at least one of the other users is less than the respective current credit amount of the at least one of the other users; and
reallocate credit from the at least one of the other users of the plurality of users of the shared line of credit to the first user based on the analysis to provide a first updated credit amount for the first user, wherein the first updated credit amount is greater than or equal to the first credit need of the first user,
wherein the one or more processors are configured to create a credit reallocation model by training a machine learning algorithm based on historical credit usage information related to the plurality of users of the shared line of credit and historical credit usage information related to a group that includes the plurality of users, and
wherein to predict the plurality of credit needs of the plurality of users of the shared line of credit, the one or more processors are configured to:
apply the monitored information as input to the credit reallocation model; and
predict the plurality of credit needs of the plurality of users as output from the credit reallocation model.

12. The credit allocation system of claim 11, wherein to determine that the first credit need of the first user is greater than the first current credit amount of the first user, the one or more processors are configured to:
compare the first credit need of the first user to the first current credit amount of the first user.

13. The credit allocation system of claim 11,
wherein to analyze the respective credit needs of the other users of the shared line of credit, the one or more processors are configured to determine that a second credit need of a second user of the plurality of users of the shared line of credit is less than a second current credit amount of the second user; and
wherein to reallocate the credit from the at least one of the other users of the shared line of credit to the first user, the one or more processors are configured to reallocate credit from the second user to the first user to provide the first updated credit amount for the first user.

14. The credit allocation system of claim 13,
wherein to determine that the second credit need of the second user is less than the second current credit amount of the second user, the one or more processors are further configured to determine that the second credit need of the second user is historically less than the second current credit amount of the second user based on the monitored information; and
wherein to reallocate credit from the second user to the first user, the one or more processors are configured to permanently reallocate the credit from the second user to the first user.

15. The credit allocation system of claim 13,
wherein to determine that the second credit need of the second user is less than the second current credit amount of the second user, the one or more processors are further configured to determine that the second credit need of the second user is less than the second current credit amount of the second user during a period of time based on the monitored information; and
wherein to reallocate credit from the second user to the first user, the one or more processors are configured to temporarily reallocate the credit from the second user to the first user during the period of time.

16. The credit allocation system of claim 11, wherein to analyze the respective credit needs of the other users of the shared line of credit, the one or more processors are configured to:
determine that a second credit need of a second user of the plurality of users of the shared line of credit is greater than or equal to a second current credit amount of the second user;
determine not to reallocate credit from the second user to the first user;
determine that a third credit need of a third user of the plurality of users of the shared line of credit is less than a third current credit amount of the third user;

determining that a fourth credit need of a fourth user of the plurality of users of the shared line of credit is less than a fourth current credit amount of the fourth user; and wherein to reallocate credit from the at least one of the other users of the shared line of credit to the first user, the one or more processors are configured to reallocate credit from both the third user and the fourth user to the first user to provide the first updated credit amount for the first user.

17. The credit allocation system of claim 11, wherein to analyze the respective credit needs of the other users of the shared line of credit, the one or more processors are configured to prioritize the respective credit needs of the other users, and wherein the reallocation of credit from the at least one of the other users of the shared line of credit to the first user to provide the first updated credit amount for the first user is based on the prioritization of the respective credit needs of the other users of the shared line of credit.

18. The credit allocation system of claim 11, wherein to reallocate the credit from the at least one of the other users of the shared line of credit to the first user, the one or more processors are configured to pay off at least a portion of the shared line of credit.

19. A non-transitory computer readable medium including instructions that when executed cause one or more processors to:

allocate credit from a shared line of credit to a plurality of users of the shared line of credit to provide a respective current credit amount for each user of the plurality of users;

monitor information related to a plurality of credit needs of the plurality of users of the shared line of credit, wherein the monitored information at least includes credit usage history and context information that indicate potential upcoming purchases by each user of the plurality of users;

predict, based on the monitored information, the plurality of credit needs of the plurality of users of the shared line of credit, wherein a respective credit need of each user includes the indicated potential upcoming purchases by each user of the plurality of users;

determine that a first credit need of a first user of the plurality of users is greater than a first current credit amount of the first user;

analyze the respective credit needs of other users of the plurality of users of the shared line of credit, wherein the instructions further cause the one or more processors to determine that at least one respective credit need of at least one of the other users is less than the respective current credit amount of the at least one of the other users;

reallocate credit from the at least one of the other users of the plurality of users of the shared line of credit to the first user based on the analysis to provide a first updated credit amount for the first user, wherein the first updated credit amount is greater than or equal to the first credit need of the first user; and create a credit reallocation model including training a machine learning algorithm based on historical credit usage information related to the plurality of users of the shared line of credit and historical credit usage information related to a group that includes the plurality of users, wherein the instructions that cause the one or more processors to predict the plurality of credit needs of the plurality of users of the shared line of credit comprise instructions that further cause the one or more processors to:

apply the monitored information as input to the credit reallocation model; and predict the plurality of credit needs of the plurality of users as output from the credit reallocation model.

* * * * *